(12) United States Patent
Akcayoz

(10) Patent No.: US 11,919,654 B2
(45) Date of Patent: Mar. 5, 2024

(54) AIRCRAFT INTAKE DUCT WITH PASSIVELY MOVABLE FLOW RESTRICTOR

(71) Applicant: PRATT & WHITNEY CANADA CORP., Longueuil (CA)

(72) Inventor: Eray Akcayoz, Cote-Saint-Luc (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 29 days.

(21) Appl. No.: 17/817,749

(22) Filed: Aug. 5, 2022

(65) Prior Publication Data
US 2024/0043131 A1 Feb. 8, 2024

(51) Int. Cl.
*B64D 33/02* (2006.01)
*F02C 7/042* (2006.01)

(52) U.S. Cl.
CPC ............. *B64D 33/02* (2013.01); *F02C 7/042* (2013.01); *B64D 2033/0293* (2013.01); *F05D 2220/323* (2013.01); *F05D 2250/51* (2013.01)

(58) Field of Classification Search
CPC . B64D 33/02; B64D 2033/0293; F02C 7/042; F05D 2220/323; F05D 2250/51
See application file for complete search history.

(56) References Cited

U.S. PATENT DOCUMENTS

| | | | |
|---|---|---|---|
| 3,005,618 A * | 10/1961 | Walder | F01D 9/045 |
| | | | 415/184 |
| 6,959,552 B2 | 11/2005 | Leblanc | |
| 7,488,154 B2 * | 2/2009 | Wiedermann | F02C 7/04 |
| | | | 415/222 |
| 7,559,742 B2 * | 7/2009 | Inoue | F04D 29/448 |
| | | | 415/208.2 |
| 9,068,499 B2 * | 6/2015 | Thayer | F02B 39/00 |
| 9,163,643 B2 * | 10/2015 | Masutani | F04D 29/441 |
| 9,217,369 B2 | 12/2015 | Rodriguez | |
| 9,835,161 B2 * | 12/2017 | Masutani | F04D 17/122 |
| 10,844,874 B2 * | 11/2020 | Rodrigues | F04D 29/548 |
| 11,808,207 B1 * | 11/2023 | Akcayoz | F01D 17/141 |
| 2010/0172753 A1 * | 7/2010 | Lin | F04D 29/441 |
| | | | 415/208.1 |

* cited by examiner

*Primary Examiner* — Lorne E Meade
(74) *Attorney, Agent, or Firm* — NORTON ROSE FULBRIGHT CANADA LLP.

(57) ABSTRACT

An aircraft engine, has: an inlet leading to a compressor section, the inlet extending circumferentially around a central axis; an annular inlet duct extending circumferentially around the central axis, the annular inlet duct having a duct inlet fluidly connected to an environment outside of the aircraft engine and a duct outlet fluidly connected to the inlet, the duct outlet extending circumferentially around the central axis; and a flow restrictor located within the annular inlet duct, the flow restrictor extending across the annular inlet duct, being movable within the annular inlet duct along a circumferential direction relative to the central axis in response to a fluid pressure differential on opposed sides of the flow restrictor.

20 Claims, 5 Drawing Sheets

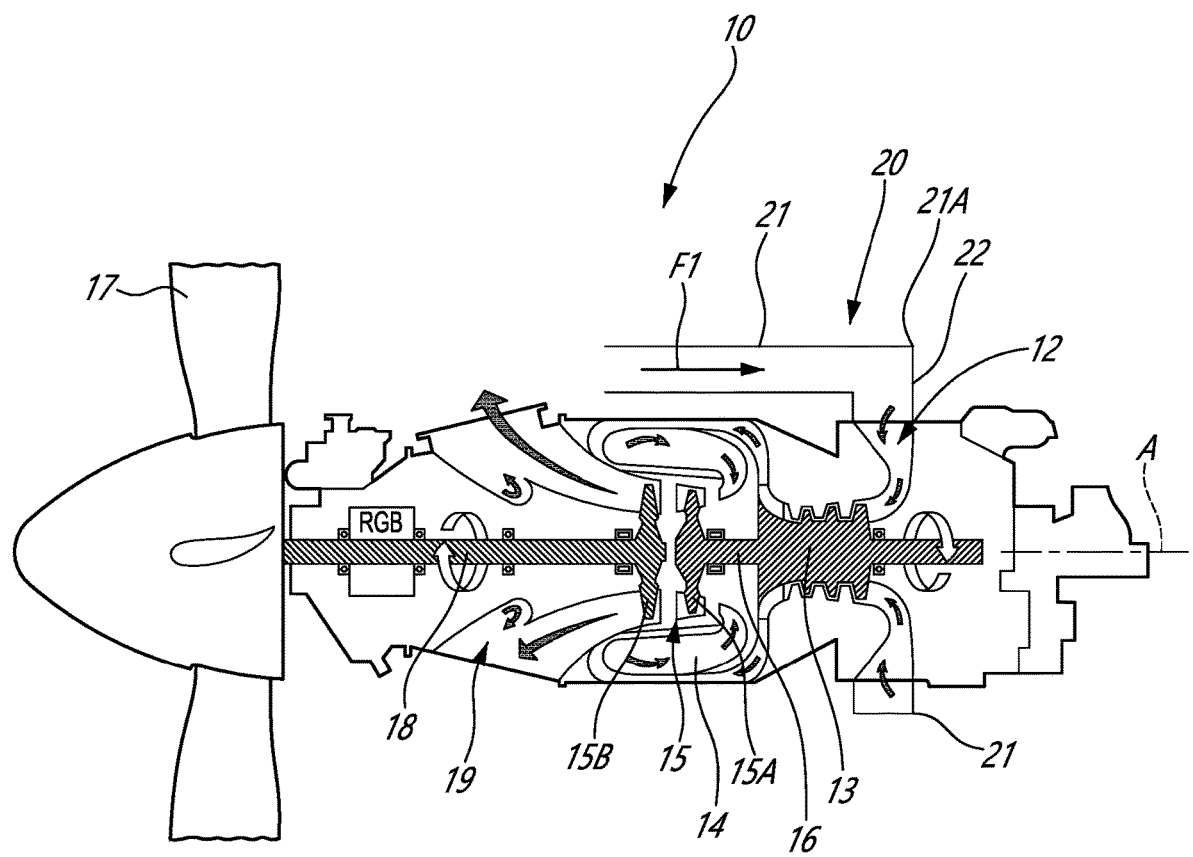

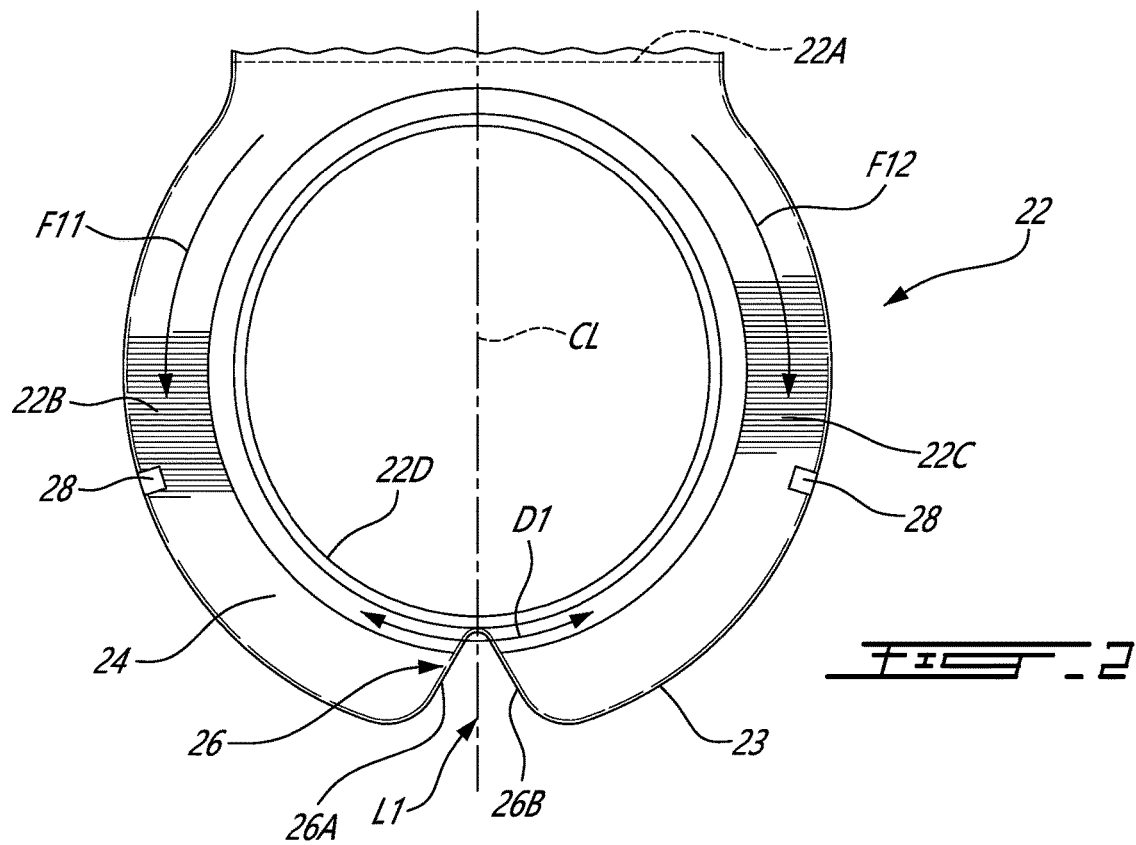
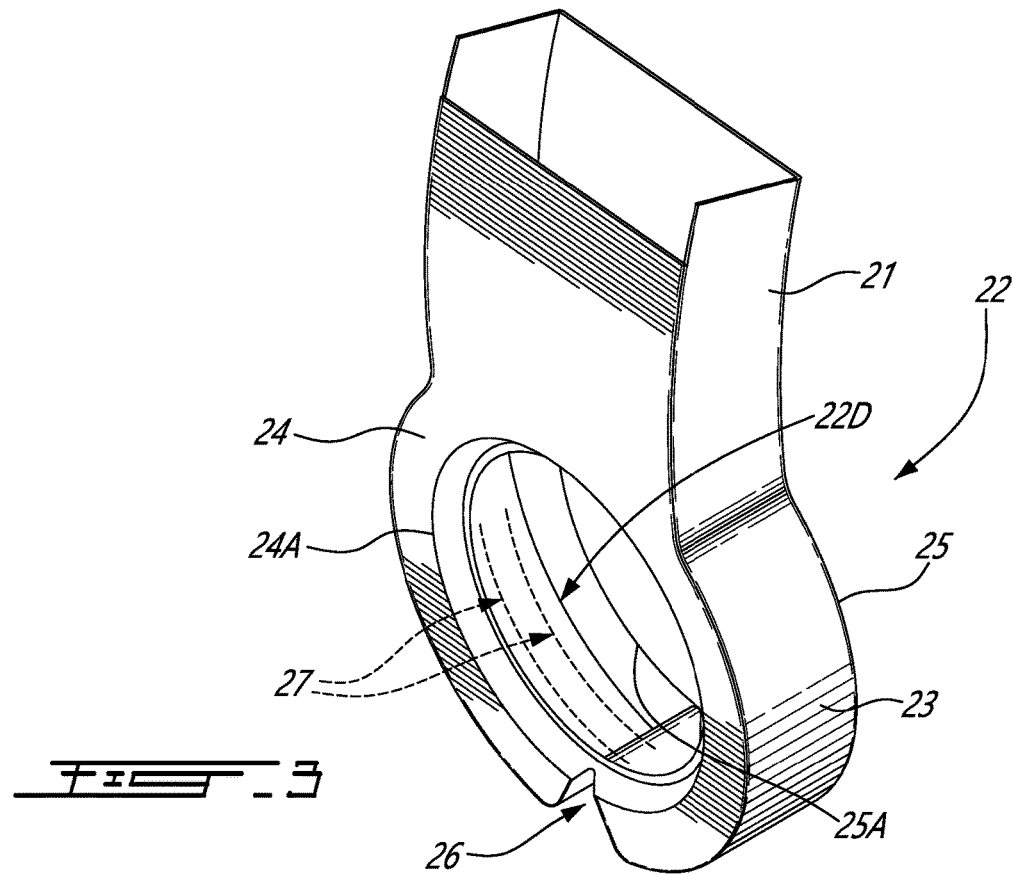

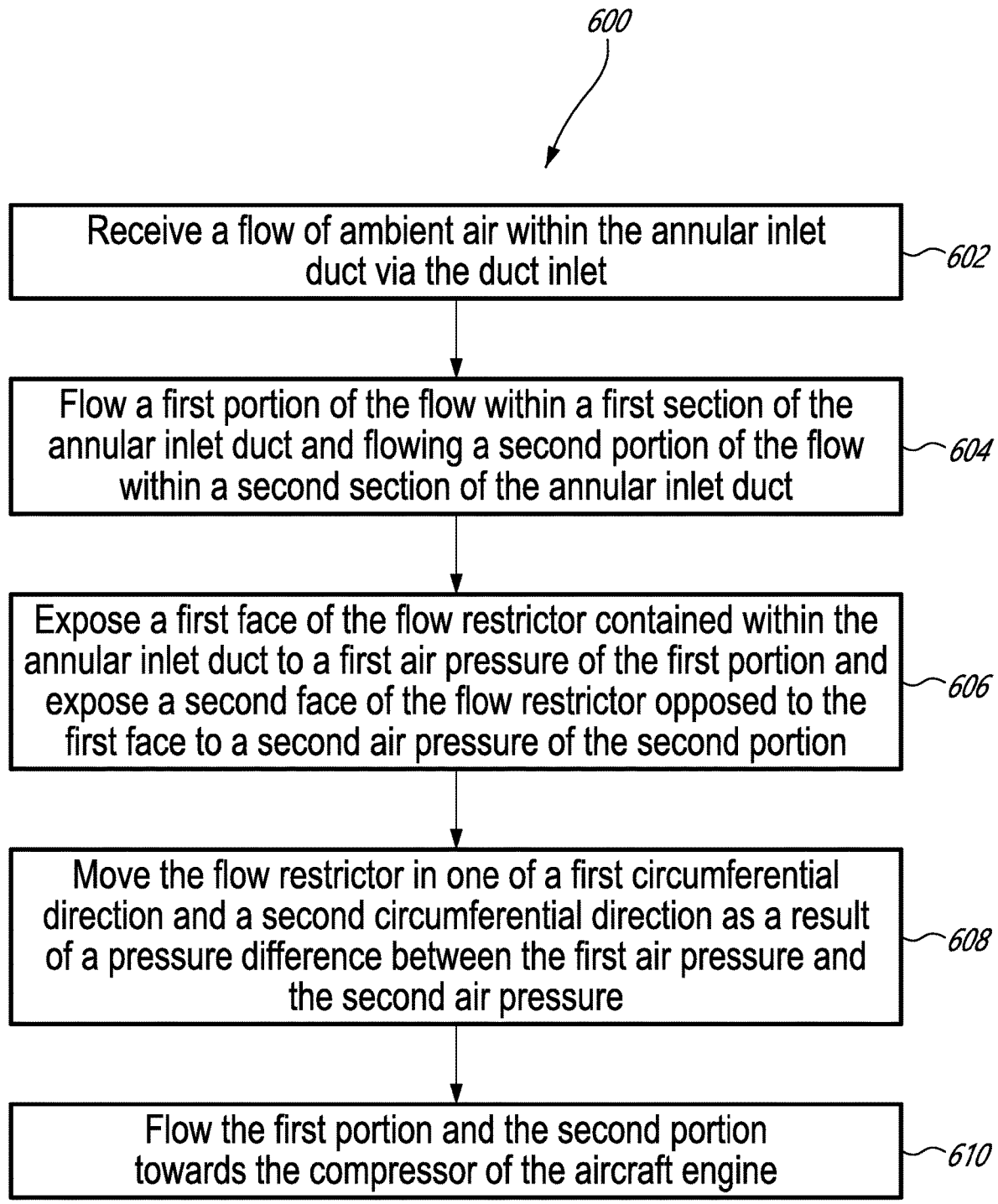

AIRCRAFT INTAKE DUCT WITH PASSIVELY MOVABLE FLOW RESTRICTOR

TECHNICAL FIELD

The application relates generally to aircraft engines and, more particularly, to inlets of compressor sections of such engines.

BACKGROUND

Some aircraft engines have an annular air inlet duct to distribute an incoming flow of air circumferentially around an inlet. Flow within this annular air inlet duct may be affected by operating conditions, such as, for instance, Mack number, sideslip angle, engine mass flow rate, and so on. Thus, improvements in this annular inlet duct are sought.

SUMMARY

In a first aspect, there is provided an aircraft engine, comprising: an inlet leading to a compressor section, the inlet extending circumferentially around a central axis; an annular inlet duct extending circumferentially around the central axis, the annular inlet duct having a duct inlet fluidly connected to an environment outside of the aircraft engine and a duct outlet fluidly connected to the inlet, the duct outlet extending circumferentially around the central axis; and a flow restrictor located within the annular inlet duct, the flow restrictor extending across the annular inlet duct, being movable within the annular inlet duct along a circumferential direction relative to the central axis in response to a fluid pressure differential on opposed sides of the flow restrictor.

The aircraft engine described above may include any of the following features, in any combinations.

In some embodiments, the flow restrictor is freely movable within the annular inlet duct.

In some embodiments, the flow restrictor is free of engagement with an actuator.

In some embodiments, the flow restrictor has a first face exposed to a first section of the annular inlet duct and a second face opposed to the first face and exposed to a second section of the annular inlet duct, the flow restrictor movable as a result of a pressure difference between a first pressure within the first section exerted on the first face and a second pressure within the second section exerted on the second face.

In some embodiments, the flow restrictor is movable by 45 degrees in both clockwise and counter clockwise directions from a baseline position being diametrically opposed to the duct inlet and intersecting a centerline of the annular inlet duct, the centerline intersecting the central axis.

In some embodiments, the annular inlet duct includes an outer wall and two side walls extending from the outer wall, the flow restrictor located between the two side walls and movably engaged to the outer wall.

In some embodiments, the flow restrictor is engaged on rails secured to the outer wall.

In some embodiments, blockers limit an amplitude of movements of the flow restrictor.

In another aspect, there is provided an intake for an aircraft engine, comprising: an annular inlet duct extending circumferentially around a central axis, the annular inlet duct having a duct inlet fluidly connected to an environment outside of the aircraft engine and a duct outlet extending circumferentially around the central axis, the annular inlet duct defining: a first section extending from the duct inlet towards a location being diametrically opposed to the duct inlet, and a second section extending from the duct inlet towards the location, the second section opposite the first section; and a flow restrictor located within the annular inlet duct, the flow restrictor extending across the annular inlet duct and fluidly separating the first section from the second section, the flow restrictor movable within the annular inlet duct along a circumferential direction relative to the central axis as a result of a pressure difference between a first pressure within the first section and a second pressure within the second section.

The intake may include any of the following features, in any combinations.

In some embodiments, the flow restrictor is freely movable within the annular inlet duct.

In some embodiments, the flow restrictor is non-actuated.

In some embodiments, the flow restrictor is free of engagement with an actuator and is movable via a pressure difference on opposite sides of the flow restrictor.

In some embodiments, the flow restrictor is movable by 45 degrees in both clockwise and counter clockwise directions from a baseline position being diametrically opposed to the duct inlet and intersecting a centerline of the annular inlet duct, the centerline intersecting the central axis.

In some embodiments, the annular inlet duct includes an outer wall and two side walls extending from the outer wall, the flow restrictor located between the two side walls and movably engaged to the outer wall.

In some embodiments, the flow restrictor is engaged on rails secured to the outer wall.

In some embodiments, blockers limit an amplitude of movements of the flow restrictor.

In yet another aspect, there is provided a method of feeding air to a compressor of an aircraft engine, the method comprising: receiving a flow of ambient air within an annular inlet duct via a duct inlet; flowing a first portion of the flow within a first section of the annular inlet duct and flowing a second portion of the flow within a second section of the annular inlet duct; exposing a first face of a flow restrictor contained within the annular inlet duct to a first air pressure of the first portion and exposing a second face of the flow restrictor opposed to the first face to a second air pressure of the second portion; moving the flow restrictor in one of a first circumferential direction and a second circumferential direction as a result of a pressure difference between the first air pressure and the second air pressure; and flowing the first portion and the second portion towards the compressor of the aircraft engine.

The method described above may include any of the following features, in any combinations.

In some embodiments, the moving of the flow restrictor includes moving the flow restrictor solely as a result of the pressure difference.

In some embodiments, the moving of the flow restrictor includes moving the flow restrictor engaged on rails secured to a wall of the annular inlet duct.

In some embodiments, the method includes limiting a motion of the flow restrictor.

BRIEF DESCRIPTION OF THE DRAWINGS

Reference is now made to the accompanying figures in which:

FIG. 1 is a schematic cross-sectional view of an aircraft engine exemplified as a gas turbine engine;

FIG. 2 is a front view of an intake of the aircraft engine of FIG. 1;

FIG. 3 is a three dimensional view of the intake of FIG. 2;

FIG. 6 is a flowchart illustrating steps of a method of feeding air to a compressor section of the aircraft engine of FIG. 1.

DETAILED DESCRIPTION

Figure 4:
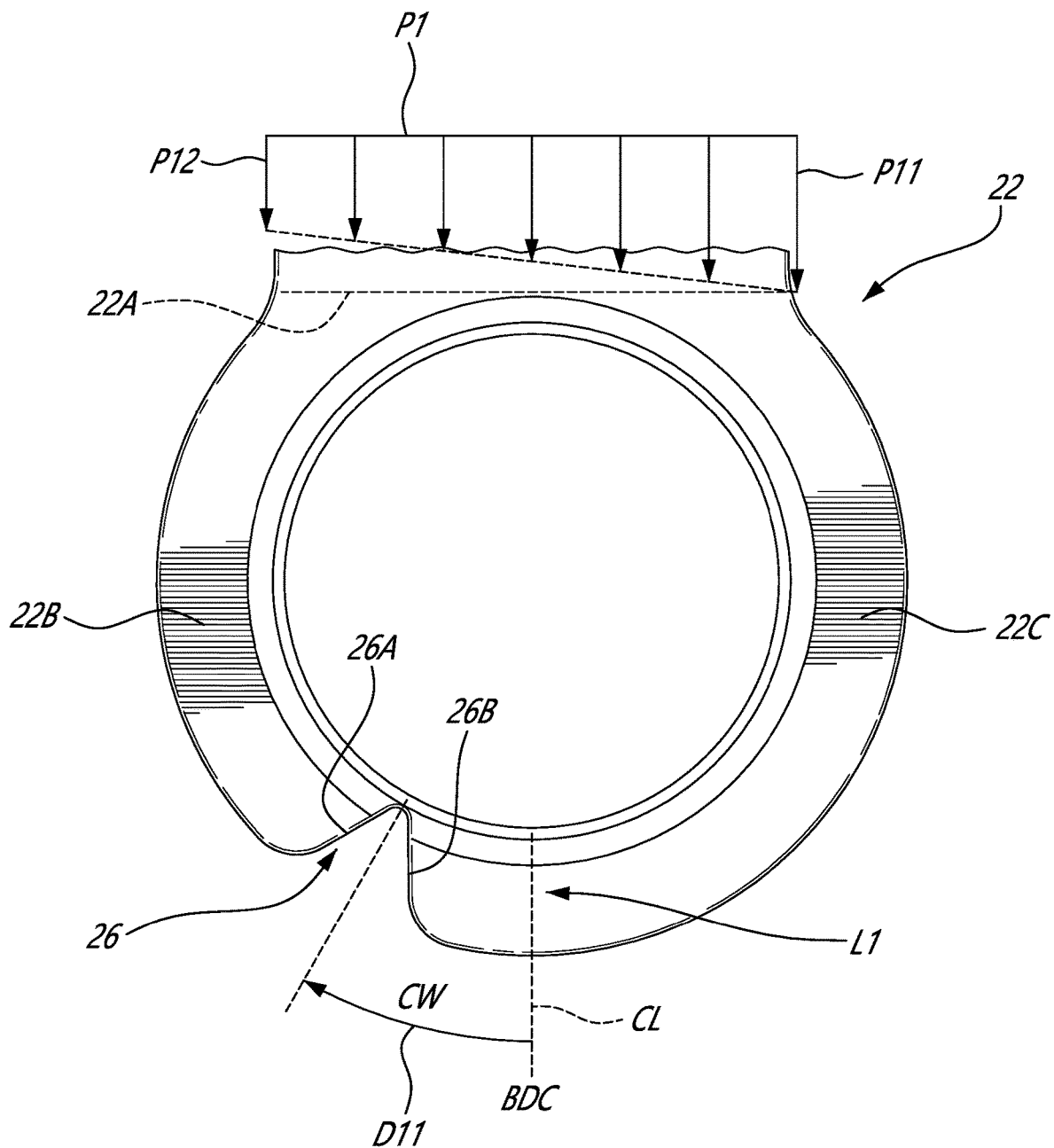
FIG. 4 is a front view of the intake of FIG. 2 shown in a first configuration.

FIG. 1 illustrates an aircraft engine depicted as a gas turbine engine 10 of a type preferably provided for use in subsonic flight, generally comprising in serial flow communication an inlet 12 for receiving air, a compressor section 13 for compressing the air received via the inlet 12, a combustor 14 for mixing fuel with the compressed air and for generating an annular stream of combustion gases. A turbine section 15 receiving the combustion gases from the combustor 14. The turbine section 15 has a high-pressure turbine 15A drivingly engaged to the compressor section 13 via a high-pressure shaft 16. The turbine section 15 further has a power or low-pressure turbine 15B downstream of the high-pressure turbine 15A and drivingly engaged to a propeller 17 via a low-pressure shaft 18. The low-pressure shaft 18 may be directly engaged to the propeller 17 or, as shown herein, drivingly engaged to the propeller 17 via a reduction gearbox RGB. The gas turbine engine 10 has an exhaust 19 for expelling the combustion gases. Although the depicted gas turbine engine 10 is a turboprop engine, the present disclosure may apply to other engines, such as turboshaft engines and to auxiliary power units (APU). In an alternate embodiment, the compressor section may include a high-pressure compressor drivingly engaged to the high-pressure turbine 15A via the high-pressure shaft 16 and a low-pressure compressor drivingly engaged to the low-pressure turbine 15B via the low-pressure shaft 18.

In the embodiment shown, the inlet 12 of the gas turbine engine 10 is fluidly connected to an intake 20. The intake 20 is used to receive air from an environment and to direct this air towards the inlet 12. The intake 20 includes a duct 21 that receives ambient air and that leads to an annular inlet duct 22 that extends circumferentially around the inlet 12 and around a central axis A of the gas turbine engine 10. The annular inlet duct 22 is therefore used to circumferentially distribute air, which is received at a given circumferential position via the duct 21, around the compressor section 13. The duct 21 may define an elbow 21A to redirect an incoming flow F1 from a substantially axial direction to a substantially radial direction relative to the central axis A. Herein, the expression "substantially" implies that variations between a purely axial (or radial) direction is possible as long as a main component of the direction of the flow is in the axial (or radial) direction. The intake 20 therefore receives air in a direction being substantially axial relative to the central axis A and redirects this air in a circumferential direction around the central axis A and in a radially-inward direction to feed the inlet 12 of the gas turbine engine 10.

Referring now to FIG. 2, the annular inlet duct 22 is shown in greater detail and includes a duct inlet 22A (shown with a dashed line) that is connected to the duct 21 (FIG. 1) for receiving ambient air. The annular inlet duct 22 further includes a first section 22B extending circumferentially relative to the central axis A from the duct inlet 22A to a location L1 opposite the duct inlet 22A, and a second section 22C extending circumferentially relative to the central axis A from the duct inlet 22A to the location L1 opposite the duct inlet 22A. The first section 22B and the second section 22C are located on opposite sides of a centerline CL of the annular inlet duct 22. The centerline CL is normal to the central axis A and intersects the location L1. The location L1 may therefore be diametrically opposed to the duct inlet 22A.

Referring to FIGS. 2-3, the annular inlet duct 22 includes an outer wall 23, a first side wall 24 secured to the outer wall 23 and extending towards the central axis A in a direction having a radial component relative to the central axis A, and a second side wall 25 opposite the first side wall 24, secured to the outer wall 23, and extending towards the central axis A along a direction having a radial component relative to the central axis A. The first side wall 24 may be parallel to the second side wall 25. Other configurations are contemplated. The annular inlet duct 22 has a duct outlet 22D leading to the inlet 12 of the gas turbine engine 10 and the compressor section 13. The duct outlet 22D is defined axially between the first side wall 24 and the second side wall More specifically, the duct outlet 22D may extend annularly around the central axis A. The duct outlet 22D may extend a full circumference around the central axis A. The duct outlet 22D may be defined axially between an inner edge 24A of the first side wall 24 and an inner edge 25A of the second side wall 25. The duct outlet 22D may therefore be considered as a gap or spacing defined between the first side wall 24 and the second side wall 25.

A flow restrictor 26, also referred to as a "ski-jump", is located within the annular inlet duct 22 and may intersect the location L1 and the centerline CL. This flow restrictor 26 is used to limit ambient air received via the duct inlet 22A from flowing from the first section 22B to the second section 22C and vice-versa. Put differently, the flow restrictor 26 may fluidly separate the first section 22B from the second section 22C. To this end, the flow restrictor 26 extends across the annular inlet duct 22 in a direction having a radial component relative to the central axis A. The flow restrictor 26 may extend radially up to the inner edges 24A, 25A of the first and second side walls 24, 25. The flow restrictor 26 may be substantially air tight. That is, the flow restrictor 26 may include a body being non-permeable to air. In some cases, the flow restrictor 26 may permit some air to flow there through. More than one flow restrictor 26 may also be used and circumferentially distributed to achieve the desired flow distribution or flow bias. The flow restrictor 26 has herein a triangular shape, but any other suitable shapes are contemplated.

In some cases, the positioning of the flow restrictor 26 on the centerline CL may affect performance of the compressor section 13 because the air flow within the annular inlet duct 22 may be non-uniform due to asymmetry in the duct 21 or due to changes in aircraft Mach number, sideslip angle, and/or engine mass flow rates, for example. Non-uniformity of air flow may result in increased total pressure losses and/or air flow distortion. This may affect performance of the compressor section 13 and of downstream components.

In the embodiment shown, the flow restrictor 26 is movable along a circumferential direction D1 (FIG. 2) relative to the central axis A and within the annular inlet duct 22. The flow restrictor 26 is movably engaged to the outer wall 23, to the first side wall 24, and/or to the second side wall 25. In the present embodiment, the flow restrictor 26 is movably engaged to the outer wall 23 via at least one rail, two rails 27 in the embodiment shown. The two rails 27 are affixed to the outer all 23. Bearings or other means may be used to assist movement of the flow restrictor 26 in the circumferential direction D1 relative to the central axis A. It will be appreciated that only one rail or more than two rails may be used. Any means allowing the flow restrictor 26 to move are contemplated.

The flow restrictor 26 is non-actuated. That is, the flow restrictor 26 may be freely movable within the annular inlet duct 22. Put differently, the flow restrictor 26 may be free of engagement with an actuator. In the present embodiment, the flow restrictor 26 has a first face 26A and a second face 26B opposed to the first face 26A. The first face 26A and the second face 26B are herein shown as being non-parallel to one another and converging towards one another towards the central axis A. Alternatively, the first face 26A and the second face 26B may be parallel to one another.

The first face 26A is exposed to a first pressure of air located within the first section 22B of the annular inlet duct 22 while the second face 26B is exposed to a second pressure of air located within the second section 22C of the annular inlet duct 22. In some cases, the first pressure may be different (e.g., greater, less) than the second pressure. This may cause the flow restrictor 26 to move in the circumferential direction D1.

The flow restrictor 26 may be movable by 45 degrees in both clockwise and counter clockwise directions from a baseline position being diametrically opposed to the duct inlet 22A. The flow restrictor 26 may be constrained to more or less than 45 degrees (e.g., 30, 90 degrees). The baseline position may correspond to the location L1 described above. The baseline position corresponds to a position of the flow restrictor 26 if pressure within the first section 22B equals the pressure in the second section 22C. Blockers 28 may be secured to the annular inlet duct 22, for instance, to any of the outer wall 23, the first side wall 24, and/or the second side wall 25, to limit movements of the flow restrictor 26. These blockers 28 may be protrusions or any kind of body secured to the annular inlet duct 22 to impede further movements of the flow restrictor 26.

Referring now to FIG. 4, air received from the duct 21 presents a first pressure field P1 at the duct inlet 22A of the annular inlet duct 22. In this case, the first pressure field P1 has a first pressure P11 on the right-hand side and a second pressure P12 on the left-hand side. The pressure may vary linearly between the first pressure P11 and the second pressure P12 although this need not be the case. The first pressure P11 is greater than the second pressure P12. Thus, the pressure in the second section 22C is greater than the pressure in the first section 22B. This creates a pressure differential between the opposed faces 26A, 26B of the flow restrictor 26 that creates a resultant force pushing the flow restrictor away from its baseline position at the location L1 towards the first section 22B along a first circumferential direction D11, which is depicted here as a clockwise direction.

Figure 5:
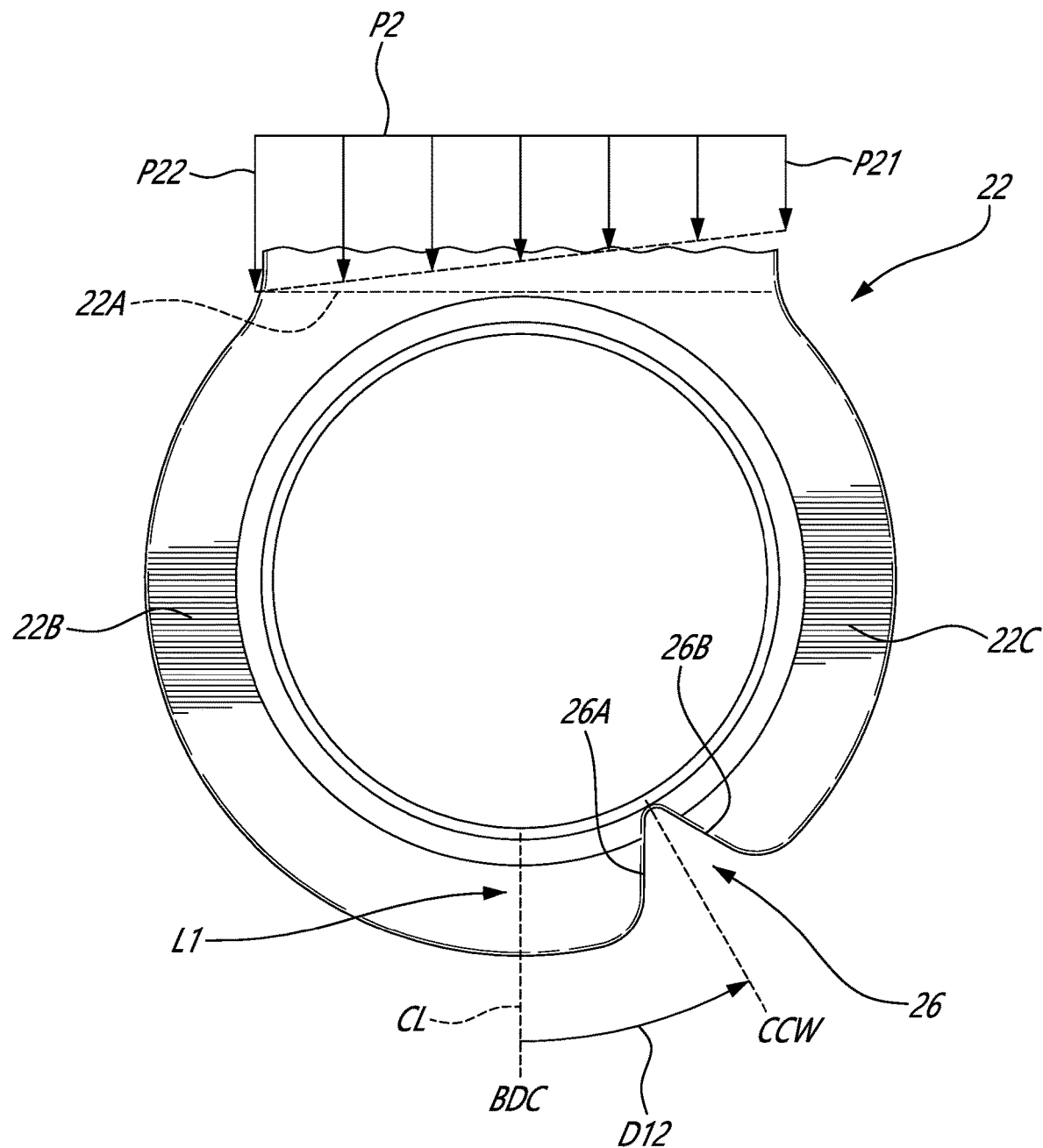
FIG. 5 is a front view of the intake of FIG. 2 shown in a second configuration.

Referring now to FIG. 5, air received from the duct 21 presents a second pressure field P2 at the duct inlet 22A of the annular inlet duct 22. In this case, the second pressure field P2 has a first pressure P21 on the right-hand side and a second pressure P22 on the left-hand side. The pressure may vary linearly between the first pressure P21 and the second pressure P12, although this need not be the case. The first pressure P21 is less than the second pressure P22. Thus, the pressure in the second section 22C is less than the pressure in the first section 22B. This creates a pressure differential between the opposed faces 26A, 26B of the flow restrictor 26 that creates a resultant force pushing the flow restrictor 26 away from its baseline position at the location L1 towards the second section 22C along a second circumferential direction D12, which is depicted here as a counter clockwise direction. The second circumferential direction D12 is opposite the first circumferential direction D11.

Thus, in the present embodiment, movements of the flow restrictor 26 may be effected passively based on pressure differences between the right-hand and left-hand sides of the flow restrictor 26. If air flow into the air inlet is biased to the right-hand side, the greater air pressure on the right-hand side (vs. the left-hand side) may cause the flow restrictor 26 to move in the clockwise direction (FIG. 4). If air flow into the air inlet is biased to the left-hand side, the greater air pressure on the left-hand side (vs. the right-hand side) may cause the flow restrictor 26 to move in the counter-clockwise direction (FIG. 5). The variable circumferential position of the flow restrictor 26 may facilitate a reduction in inlet air pressure losses, a reduction in compressor inlet flow distortion, and/or increased compressor stall margin.

Referring now to FIG. 6, a flowchart illustrating steps of a method 600 of feeding air to the compressor section 13 of the gas turbine engine 10 is shown. The method 600 includes receiving a flow F1 (FIG. 1) of ambient air within the annular inlet duct 22 via the duct inlet 22A at 602; flowing a first portion F11 (FIG. 2) of the flow within the first section 22B and flowing a second portion F12 (FIG. 2) of the flow within the second section 22C at 604; exposing the first face 26A of the flow restrictor 26 to the first air pressure of the first section 22B and exposition the second face 26B of the flow restrictor 26 opposed to the first face 26A to the second air pressure of the second section 22C at 606; moving the flow restrictor 26 in one of the first circumferential direction D11 and the second circumferential direction D12 as a result of the pressure difference between the first air pressure and the second air pressure at 608; and flowing the first portion F11 the second portion F12 towards the compressor section 13 at 610.

In the embodiment shown, the moving of the flow restrictor 26 includes moving the flow restrictor solely as a result of the pressure difference. The moving of the flow restrictor 26 may include moving the flow restrictor 26 engaged on the rails 27 secured to a wall of the annular inlet duct 22. The method 600 may include limiting a motion of the flow restrictor 26. This may be carried with the blockers 28 described herein above.

In the present disclosure, the expression "about" implies variations of plus or minus 10%.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
an inlet leading to a compressor section, the inlet extending circumferentially around a central axis;
an annular inlet duct extending circumferentially around the central axis, the annular inlet duct having a duct inlet fluidly connected to an environment outside of the aircraft engine and a duct outlet fluidly connected to the inlet, the duct outlet extending circumferentially around the central axis; and
a flow restrictor located within the annular inlet duct, the flow restrictor extending across the annular inlet duct, being movable within the annular inlet duct along a circumferential direction relative to the central axis in response to a fluid pressure differential on opposed sides of the flow restrictor.

2. The aircraft engine of claim 1, wherein the flow restrictor is freely movable within the annular inlet duct.

3. The aircraft engine of claim 2, wherein the flow restrictor is free of engagement with an actuator.

4. The aircraft engine of claim 1, wherein the flow restrictor has a first face exposed to a first section of the annular inlet duct and a second face opposed to the first face and exposed to a second section of the annular inlet duct, the flow restrictor movable as a result of a pressure difference between a first pressure within the first section exerted on the first face and a second pressure within the second section exerted on the second face.

5. The aircraft engine of claim 1, wherein the flow restrictor is movable by 45 degrees in both clockwise and counter clockwise directions from a baseline position being diametrically opposed to the duct inlet and intersecting a centerline of the annular inlet duct, the centerline intersecting the central axis.

6. The aircraft engine of claim 1, wherein the annular inlet duct includes an outer wall and two side walls extending from the outer wall, the flow restrictor located between the two side walls and movably engaged to the outer wall.

7. The aircraft engine of claim 6, wherein the flow restrictor is engaged on rails secured to the outer wall.

8. The aircraft engine of claim 6, comprising blockers to limit an amplitude of movements of the flow restrictor.

9. An intake for an aircraft engine, comprising:
an annular inlet duct extending circumferentially around a central axis, the annular inlet duct having a duct inlet fluidly connected to an environment outside of the aircraft engine and a duct outlet extending circumferentially around the central axis, the annular inlet duct defining:
a first section extending from the duct inlet towards a location being diametrically opposed to the duct inlet, and
a second section extending from the duct inlet towards the location, the second section opposite the first section; and
a flow restrictor located within the annular inlet duct, the flow restrictor extending across the annular inlet duct and fluidly separating the first section from the second section, the flow restrictor movable within the annular inlet duct along a circumferential direction relative to the central axis as a result of a pressure difference between a first pressure within the first section and a second pressure within the second section.

10. The intake of claim 9, wherein the flow restrictor is freely movable within the annular inlet duct.

11. The intake of claim 9, wherein the flow restrictor is non-actuated.

12. The intake of claim 11, wherein the flow restrictor is free of engagement with an actuator and is movable via a pressure difference on opposite sides of the flow restrictor.

13. The intake of claim 9, wherein the flow restrictor is movable by 45 degrees in both clockwise and counter clockwise directions from a baseline position being diametrically opposed to the duct inlet and intersecting a centerline of the annular inlet duct, the centerline intersecting the central axis.

14. The intake of claim 9, wherein the annular inlet duct includes an outer wall and two side walls extending from the outer wall, the flow restrictor located between the two side walls and movably engaged to the outer wall.

15. The intake of claim 14, wherein the flow restrictor is engaged on rails secured to the outer wall.

16. The intake of claim 14, comprising blockers to limit an amplitude of movements of the flow restrictor.

17. A method of feeding air to a compressor of an aircraft engine, the method comprising:
receiving a flow of ambient air within an annular inlet duct via a duct inlet;
flowing a first portion of the flow within a first section of the annular inlet duct and flowing a second portion of the flow within a second section of the annular inlet duct;
exposing a first face of a flow restrictor contained within the annular inlet duct to a first air pressure of the first portion and exposing a second face of the flow restrictor opposed to the first face to a second air pressure of the second portion;
moving the flow restrictor in one of a first circumferential direction and a second circumferential direction as a result of a pressure difference between the first air pressure and the second air pressure; and
flowing the first portion and the second portion towards the compressor of the aircraft engine.

18. The method of claim 17, wherein the moving of the flow restrictor includes moving the flow restrictor solely as a result of the pressure difference.

19. The method of claim 17, wherein the moving of the flow restrictor includes moving the flow restrictor engaged on rails secured to a wall of the annular inlet duct.

20. The method of claim 17, comprising limiting a motion of the flow restrictor.

* * * * *